Oct. 12, 1948.　　　　　J. KEISER　　　　　2,450,967
COMBINED PIPE WRENCH AND VISE
Filed Jan. 27, 1947　　　　　　　　　　2 Sheets-Sheet 1
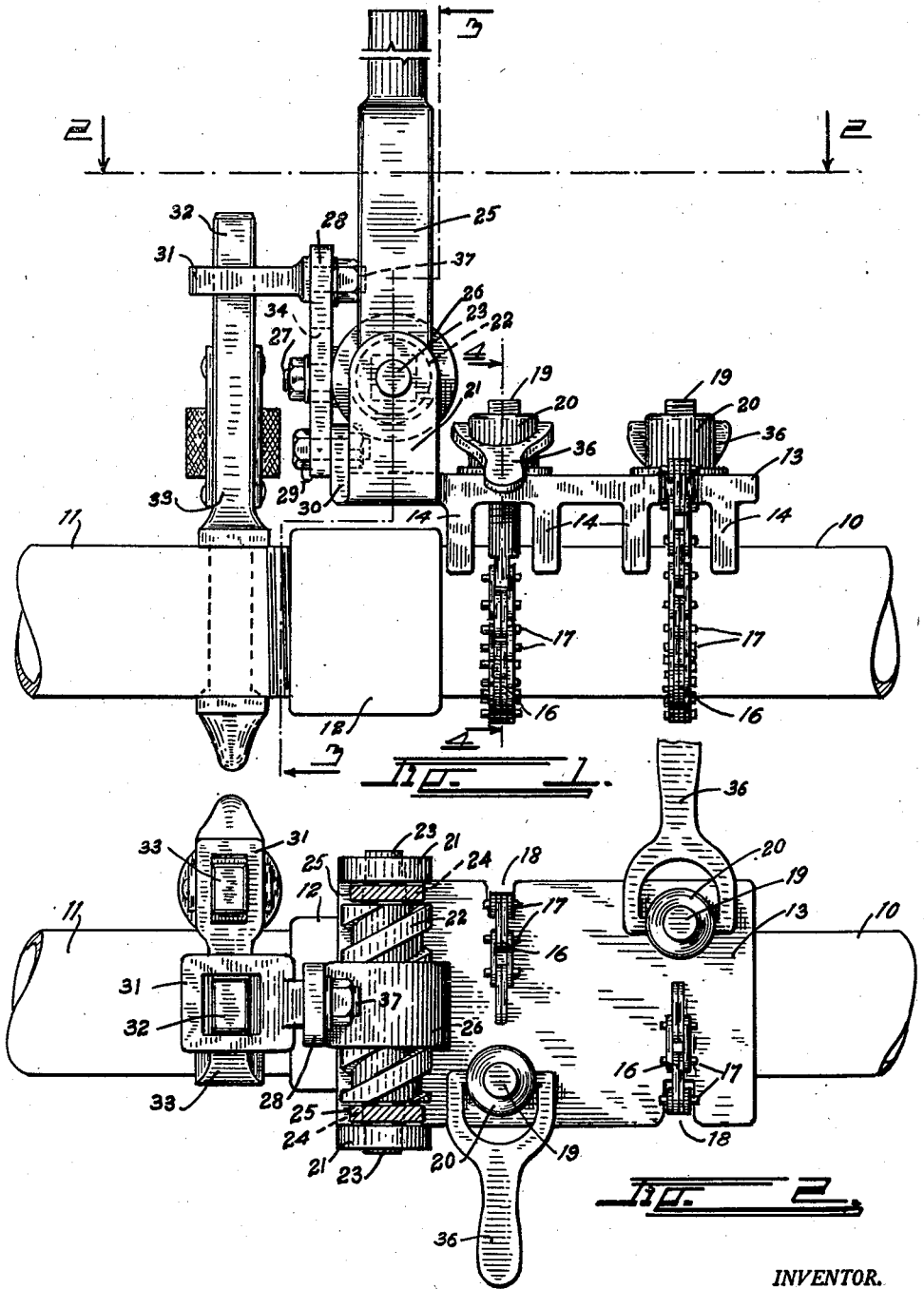
INVENTOR.
JOHN KEISER.
BY
ATTORNEY.

Oct. 12, 1948.  J. KEISER  2,450,967
COMBINED PIPE WRENCH AND VISE
Filed Jan. 27, 1947  2 Sheets-Sheet 2
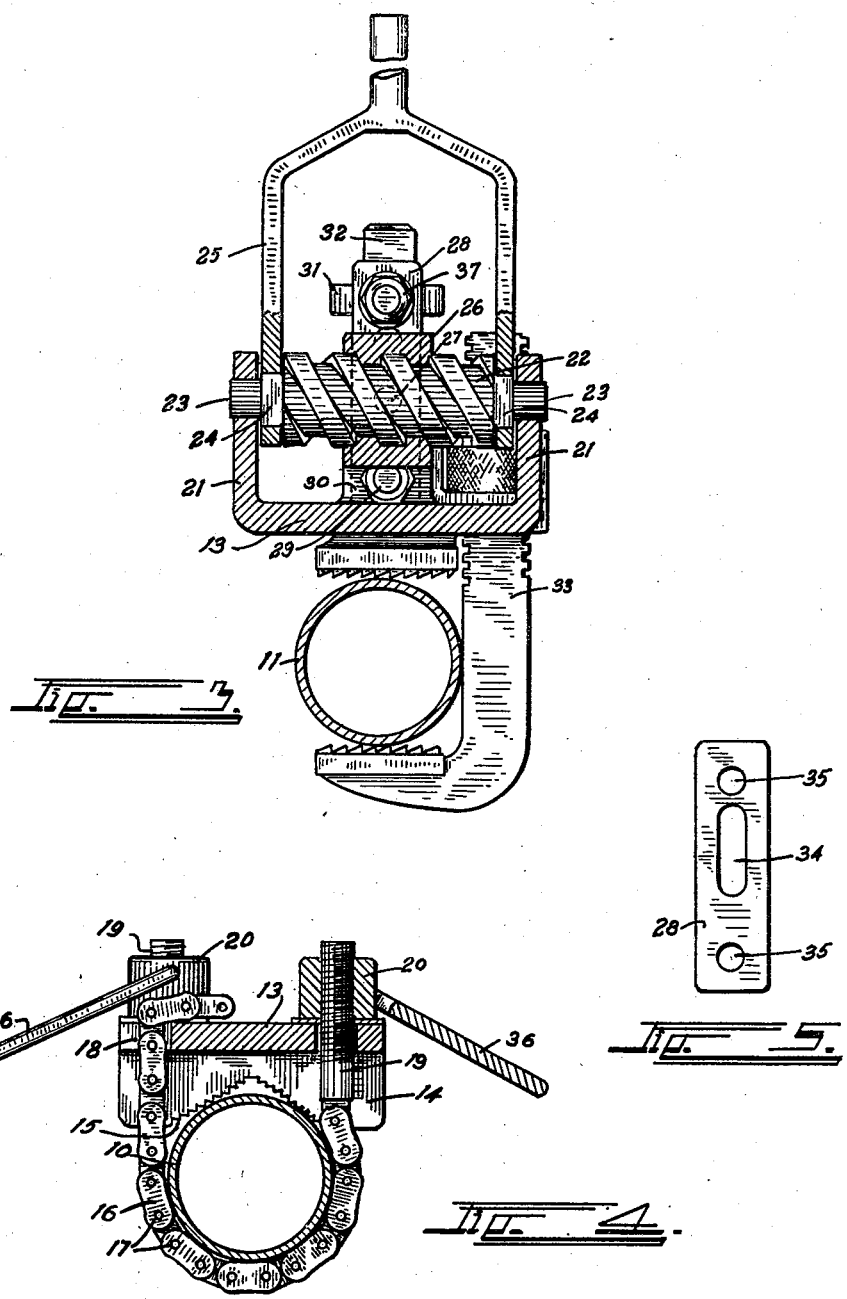
INVENTOR.
JOHN KEISER.
BY
ATTORNEY.

Patented Oct. 12, 1948

2,450,967

UNITED STATES PATENT OFFICE 2,450,967

COMBINED PIPE WRENCH AND VISE

John Keiser, Windsor, Colo.

Application January 27, 1947, Serial No. 724,654

3 Claims. (Cl. 81—53)

This invention relates to a pipe wrench, more particularly to a combined pipe wrench and vise for use in connecting the pipe lengths of a pipe line. The principal object of the invention is to provide a device of this character which can be quickly and easily attached to the extremity of one length of pipe and employed to rotate an adjacent pipe length for connecting or disconnecting the two lengths.

Another object of the invention is to construct the device so that the reaction of the effort rotating the second pipe length in one direction will be used to urge the first length in the opposite direction so as to relieve all twisting strains and stresses on the pipe line.

A further object of the invention is to provide a device of this character which can be used in relatively narrow spaces and trenches.

Other objects and advantages reside in the detail construction of the invention, which is designed for simplicity, economy, and efficiency. These will become more apparent from the following description.

In the following detailed description of the invention, reference is had to the accompanying drawing which forms a part hereof. Like numerals refer to like parts in all views of the drawing and throughout the description.

Fig. 1 is a side view of the improved pipe wrench illustrating it in place on one pipe length and being used to couple a second pipe length thereto;

Fig. 2 is a plan view thereof;

Fig. 3 is a cross-section taken on the line 3—3, Fig. 1 and;

Fig. 4 is a cross-section taken on the line 4—4, Fig. 1.

Fig. 5 is a plan view of the wrench lever.

In the drawing, two lengths of conventional pipe are illustrated at 10 and 11 connected by the usual coupling 12.

The invention comprises a frame or table 13 provided on its bottom with laterally extending supporting flanges 14. The flanges 14 are formed with upwardly extending V-shaped toothed notches 15 adapted for the table 13.

The table is attached to a pipe length, such as the length 10, by means of two clamping chains 16. These chains are of the type usually employed on pipe vises and are provided with protruding studs 17 which overlap the side edges of receiving notches 18 formed in the sides of the table 11. One extremity of each chain 16 terminates in a jack-screw 19 which extends upwardly through the table 13 and is supported by a threaded nut 20 resting thereon. The nuts 20 are of the usual pipe vise type or are provided with hinged handles 36 by means of which they may be rotated to tighten the clamping chains 17 around the pipe.

Thus, the table can be securely clamped to a pipe of any desired size by shifting the studs 17 in the receiving notches 18 so as to cause the chains to roughly encircle the pipe and then by tightening the nuts 20 to cause the chains to tightly clamp the pipe.

The table 13 is provided at its one extremity with two upstanding bearing ears 21 which rotatively support a horizontally positioned threaded shaft 22. The shaft 22 is formed with rounded bearing extremities 23 and with square lever-receiving portions 24.

The shaft 22 may be oscillated back and forth by means of a bifurcated handle 25, the furcations of which engage the square portions 24 of the shaft 22. The shaft 22 carries a threaded nut 26 which will move back and forth along the shaft as the latter is oscillated by the handle 25. The nut 26 carries a threaded stud 27 which projects through an elongated opening 34 in a wrench lever 28 intermediate the extremities of the latter.

The lower extremity of the wrench lever 28 is hingedly mounted upon a hinge bolt 29 extending through an upstanding ear 30 at the extremity of the table 13. The upper extremity of the lever 28 carries a pivoted wrench loop 31. The wrench loop 31 is designed to receive the handle, indicated at 32, of any conventional pipe wrench 33.

It can be readily seen that if the handle 25 is swung back and forth longitudinally of the axis the pipe lengths 10 and 11 it will cause the nut 26 to move back and forth along the length of the threaded shaft 22 and at right angles to the said axis. The nut 26 will, in turn, cause the wrench lever 28 to swing back and forth about the hinge bolt 29. The upwardly projected extremity of the wrench lever will multiply the movement of the nut 26 and transmit the multiplied movement to the pipe wrench 33 causing the latter to thread pipe length 11 into the coupling 12.

If it is desired to unscrew the length 11, the pipe wrench is removed and replaced on the opposite side of the pipe. It can be seen that when the handle 25 swings the lever 28, torque is applied to rotate or twist the pipe length 11 in one direction, and a torque is applied to the pipe length 10 tending to rotate the latter in the opposite direction to counteract any twisting moment on the pipe line.

While a conventional, rigid pipe wrench has been illustrated, it is desired to be understood that this invention is not dependent upon any particular type of wrench and will be found valuable for any type usable for rotating a length of pipe.

While a specific form of the improvement has been described and illustrated herein, it is desired to be understood that the same may be varied, within the scope of the appended claims, without departing from the spirit of the invention.

Having thus described the invention, what is claimed and desired secured by Letters Patent is:

1. A pipe wrench comprising: a table portion adapted to rest upon the top a length of pipe adjacent one extremity thereof; means for securing said table portion to said length; a threaded shaft rotatably supported from said table and extending transversally of the axis of said length; a lever mounted on said shaft for oscillating the latter; a threaded nut on said shaft to move longitudinally thereof as said shaft is oscillating; a wrench lever hinged to said table to swing in a transverse plane to said pipe; means transmitting the movements of said nut to swing said wrench lever; a pipe wrench adapted to engage an adjacent pipe length; and means for transmitting the swinging movement of said wrench lever to said pipe wrench to cause the latter to screw the second length into the first length.

2. A pipe wrench comprising: a table portion adapted to rest upon the top a length of pipe adjacent one extremity thereof; means for securing said table portion to said length; a threaded shaft rotatably supported from said table and extending transversely of the axis of said length; a lever mounted on said shaft for oscillating the latter; a threaded nut on said shaft to move longitudinally thereof as said shaft is oscillating; a wrench lever hinged to said table to swing in a transverse plane to said pipe and extending across the axis of said shaft; a stud projecting from said nut into a receiving opening in said wrench lever to transmit the movements of the former to the latter; a pipe wrench adapted to engage and rotate an adjacent pipe length; and means for transmitting the movements of said wrench lever to said pipe wrench to cause the latter to thread the second pipe length into the first pipe length.

3. A pipe wrench comprising: a table portion adapted to rest upon the top a length of pipe adjacent one extremity thereof; means for securing said table portion to said length; a threaded shaft rotatably supported from said table and extending transversally of the axis of said length; a lever mounted on said shaft for oscillating the latter; a threaded nut on said shaft to move longitudinally thereof as said shaft is oscillating; a wrench lever; a hinge pin securing said lever to said table, the axis of said pin being parallel to the axis of said pipe so that said lever will swing in transverse plane; a stud projecting from said nut into a receiving opening in said wrench lever to transmit the movements of the former to the latter; a pipe wrench adapted to engage and rotate an adjacent pipe length; and a looped member mounted on the extremity of said wrench lever receiving said pipe wrench for transmitting the movements of said wrench lever thereto to cause said wrench to thread the second pipe length into the first pipe length.

JOHN KEISER.

REFERENCES CITED

The following references are of record in the file of this patent:

UNITED STATES PATENTS

| Number | Name | Date |
|---|---|---|
| 443,312 | Bode | Dec. 23, 1890 |
| 1,150,178 | Diefendorf | Aug. 17, 1915 |
| 1,385,228 | Reynolds | July 19, 1921 |
| 1,634,602 | Wilson | July 5, 1927 |
| 1,777,084 | Heer | Sept. 30, 1930 |
| 1,828,173 | Carnelli | Oct. 20, 1931 |